March 10, 1964 F. ROTH 3,124,011
STEERING WHEEL LOCKING JACK
Filed March 31, 1961 2 Sheets-Sheet 1
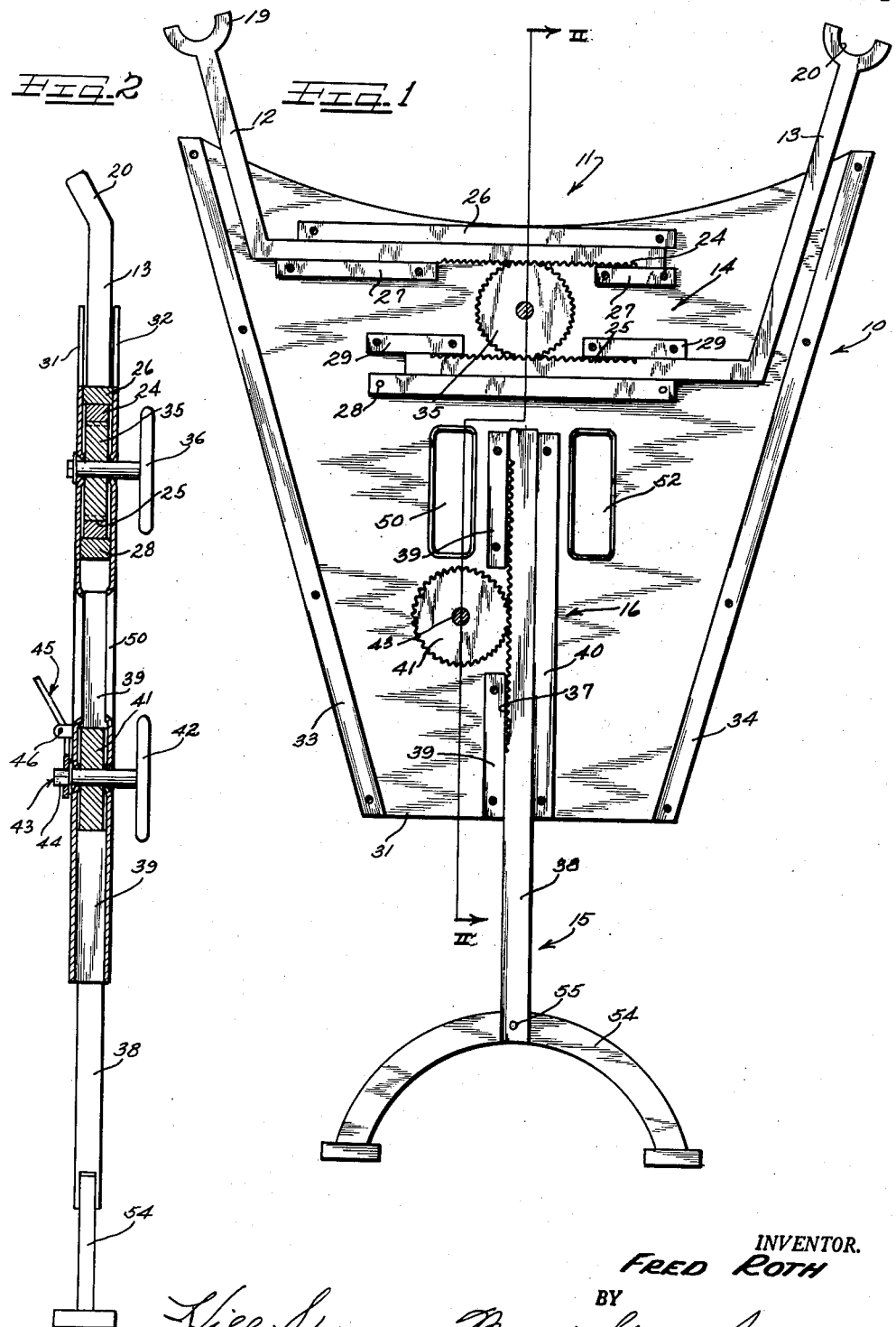
INVENTOR.
FRED ROTH
BY
ATTORNEYS March 10, 1964  F. ROTH  3,124,011
STEERING WHEEL LOCKING JACK
Filed March 31, 1961  2 Sheets-Sheet 2

INVENTOR.
FRED ROTH
BY
ATTORNEYS

United States Patent Office 3,124,011
Patented Mar. 10, 1964

3,124,011
STEERING WHEEL LOCKING JACK
Fred Roth, 421 Birch Ave., Lake Bluff, Ill.
Filed Mar. 31, 1961, Ser. No. 99,802
5 Claims. (Cl. 74—495)

The present invention relates to a mechanism for locking a steering system and particularly to a mechanism which can be placed on the floor boards of a vehicle beneath the steering wheel and be engaged with the steering wheel to hold it non-rotatably.

In a vehicle such as an automobile the steering system is locked against rotation and movement under certain circumstances, such as when the vehicle is damaged at the rear end and must be towed backward by hoisting the rear end off the ground and with the front end being supported solely on the front wheels. While towing an automobile backwards it is necessary to lock the steering system preferably so that the front wheels are aligned with the vehicle. Unless the wheels are locked the steering system will tend to snap back and forth with consequent damage and towing itself becomes dangerous. In circumstances where a vehicle must be picked up with a tow rig simple methods of locking the steering system are sought and it is common to tie a rope to the steering wheel and loop it through the open windows of the vehicle, trying the ends of the rope to the automobile door handles. The disadvantages of this arrangement are obvious since the vehicle windows must be open in inclement weather and the holding of the steering wheel is insecure and not fully safe.

It is accordingly an objective of the present invention to provide an improved mechanism for easily locking the steering system of a motor vehicle which is well suited for use in the field such as when a damaged vehicle must be towed back to the shop and which is suitable for use at any time when the steering system must be locked.

A further object of the invention is to provide an improved mechanism which locks a vehicle steering system by holding the steering wheel against rotation and which is relatively simple and inexpensive to construct and is uncomplicated to handle so that it is well suited for carrying in a tow truck and for purchase by the average service garage.

A still further object of the invention is to provide an improved mechanism for holding the steering system of a vehicle against movement in an improved manner for purposes of vehicle handling or repair and wherein one unit is readily adjustable for use with all types and sizes of vehicles and can be used for either mechanical or power steering systems.

A still further object of the invention is to provide an improved mechanism for locking the steering wheel of a vehicle against rotation having improved features for rapid installation and removal and for ease of adjustment and locking.

Other objects and advantages will become more apparent with the teaching of the principles of the invention in connection with the disclosure of the preferred embodiment thereof in the specification, claims and drawings, in which:

FIGURE 1 is a vertical elevational view shown partially in section of a mechanism constructed in accordance with the principles of the present invention;

FIGURE 2 is a vertical sectional view taken substantially along line II—II of FIGURE 1;

As shown on the drawings:

Figure 3:
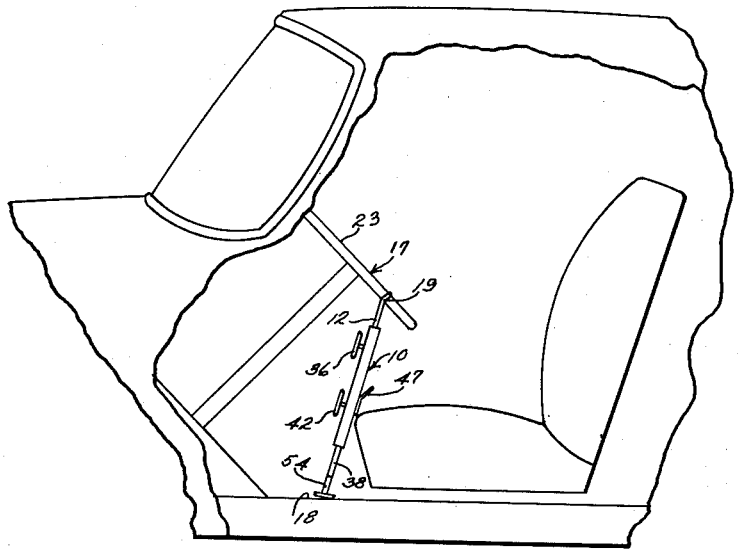
FIGURE 3 is an elevational view showing the mechanism in position for locking the steering system of the vehicle.

As illustrated in FIGURES 1 and 2, the mechanism for locking a steering system by engaging the steering wheel and preventing rotation thereof is shown generally at 10 as having a forked holding member 11 including a pair of arms 12 and 13. The arms are provided with a spreading mechanism 14 for moving the arms to holding position or moving them together to release the steering wheel. The holding member 11 is mounted on a support 15 and a vertical elevating mechanism 16 is connected between the support 15 and the holding member 11 for raising the member against a steering wheel or lowering it to release position. The locking mechanism 10 is shown in FIGURE 3 in position to lock a steering wheel 17 of a vehicle, supported on the floor or floor boards 18 of the vehicle.

In greater detail, the forked holding member 11 preferably embodies the arms 12 and 13 which have bifurcated upper ends 19 and 20 respectively so as to straddle or be seated on the rim or ring 23, FIGURE 3, of the steering wheel 17 and to slide up against the ends of the spokes (not shown). The arms 12 and 13 are spread apart so that the bifurcated ends 19 and 20 engage the rim 23 of the steering wheel preventing the mechanism from moving laterally with respect to the wheel 17.

The arms 12 and 13 extend upwardly in a slightly outwardly projecting angular direction and have horizontal portions forming racks 24 and 25.

The rack 24 for the arm 12 is slidably held between bearing bars 26 and 27 which extend horizontally and have sliding bearing surfaces engaging the horizontal portion of the arm 12 for supporting the rack 24. Similarly, the rack 25 is supported by bearing bars 28 and 29 which engage the lower portion of the arm 13. The bearing bars 26, 27, 28 and 29 are clamped and suitably attached between sheet metal plates 31 and 32 which form part of the frame 30. The frame provides a convenient mechanism for interconnecting all of the parts and the sheet metal plates 31 and 32 are held in their spaced positions by separating bars 33 and 34 which extend along the edge and the plates extend to the edges of the bars 33 and 34 in a preferred arrangement or may be turned inwardly over the outer surfaces of the bars 33 and 34. The upper edges of the plates 31 and 32 are separated so that the arms 12 and 13 can project and slide laterally.

For moving the arms outwardly to a holding position against the steering wheel ring 23 or moving them inwardly, a pinion 35 is rotatably supported in meshing engagement with the racks 24 and 25. The pinion is manually rotatable by a hand wheel 36 so that the operator can spread the arms 12 and 13.

The holding member 11 is elevated by the mechanism 16 which includes a rack 37. The rack is formed as an integral part of a vertical support rod 38 which is slidably held between vertical bearing bars 39 and 40 which are suitably attached and clamped between the frame plates 31 and 32. As will be appreciated, the bearing bars and the spacer bars may be connected to the frame plates such as by extending bolts or rivets through the plates or by welding.

The forked holding member 11 is elevated up against the steering wheel by a pinion 41 engaging the rack 37 and the pinion is rotatably mounted between the frame plates 31 and 32 and is rotated by a hand wheel 42.

The elevating pinion 41 is locked in its rotated position by a mechanism which is releasable for adjustment, and for this purpose the pinion is rotatably mounted on a shaft 43 having a shaped end 44 which may be of any shape capable of locking such as being square or hexagonal. A locking handle 45 is pivotally mounted on a pin 46 which is supported on ears 46a on the plate 31 of the frame. The handle has a hand grip portion 47 on one end and a locking plate 48 at the other end with an opening 49 therein of the shape of the end 44 of the pinion shaft 43. Thus, when the handle 45 is released, the spring 53 will move the plate down against the frame plate 31 to lock over the end 44 of the shaft and prevent its rotation.

Figure 4:
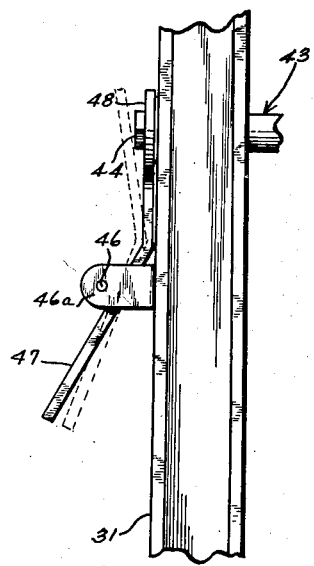
FIGURE 4 is a fragmental enlarged detail side elevational view illustrating features of the locking mechanism for the adjustment of the device.
Figure 5:
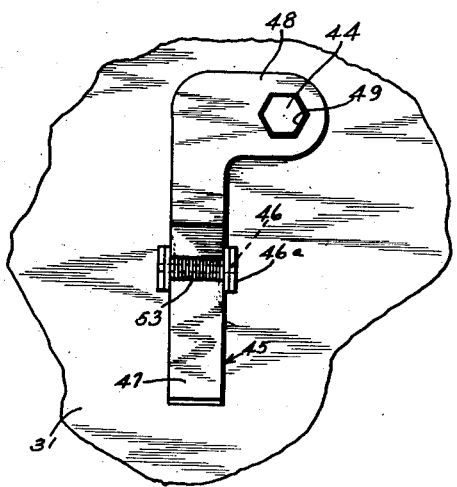
FIGURE 5 is a fragmental enlarged front elevational view showing the mechanism of FIGURE 4.

The handle may be positioned with the hand grip portion 47 extending downwardly, as shown in FIGURES 4 and 5, or extending upwardly as shown in FIGURES 2 and 3. When the hand grip extends upwardly, for reaching the handle portion 47 from the same side of the frame as the hand wheels 36 and 42, an opening 50 is formed in the frame. This opening and a similar opening 52 are formed by openings through the plates 31 and 32 and the edges of the plates may be turned inwardly to form a smooth periphery for the openings.

The handle is biased toward locked position by a coiled torsion spring 53 which surrounds the pin 46 and has ends engaging the handle 45 and the plate 31. Thus, when the handle is released, the plate will automatically snap in locking position as soon as the end 44 of the shaft reaches a position where it is aligned with the opening 49.

The support member 15 for the mechanism includes a yoke shaped base 54 which is pivotally connected by a pivotal pin 55 to the vertical rod 38. The base 54 will thus tilt to conform to the shape or slant of the floor boards of the vehicle so that a uniform vertical force will be applied to each spoke of the steering wheel. Also, the mechanism can be set at an angle in the event the steering wheel must be slightly turned so that the steering wheel spokes are not exactly horizontal at the position that the vehicle wheels are to be locked.

In operation, the steering wheel 17 of the vehicle is turned to a position in which the vehicle wheels are to be locked and the mechanism 10 is set in place beneath the wheel with the base 54 resting on the floor boards 18 of the vehicle. The arms 12 and 13 are positioned beneath the spokes of the steering wheel and the bifurcated ends 19 and 20 straddle the ring 23. The holding member 11 is raised to a position where the arm ends can straddle the ring by turning the hand wheel 42 and the hand wheel shaft is first released by pulling the locking handle to the position shown in the dotted line position of FIGURE 4. When the holding member is raised adequately, the arms 12 and 13 are spread by turning the hand wheel 36 until the bifurcated ends 19 and 20 engage the steering wheel ring 23. It may be necessary to alternately adjust the two hand wheels 36 and 42 for optimum adjustment of the spread of the arms 12 and 13 and the height of adjustment of the holding member 11. When locked position is reached the locking handle 45 is released and it will snap to the locking position shown in the solid line positions of FIGURES 2, 4.

Thus it will be seen that I have provided an improved mechanism for locking the steering system of vehicles which meets the objectives and advantages and has the features above described. The mechanism in its preferred form is constructed for rapid adjustment and is lightweight so as to be capable of being easily carried without consuming unnecessary space.

Also, the mechanism is designed so as to be capable of inexpensive construction and the parts can be easily manufactured and assembled through an inexpensive manufacturing procedure and costly machining is not necessary. Also, close tolerances are not necessary in manufacture. The mechanism is rapidly and readily applied for locking a steering system and can be just as easily and quickly removed. No alteration to the steering system itself is required so that as soon as the mechanism is removed free steering is again available.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A mechanism for locking the steering system of a vehicle comprising a forked holding member having arms for engaging beneath the ring of a steering wheel, means for adjustably spreading said arms to extend to the ring of the wheel at the ends of spokes, means holding the arms in their spread positions, a support member connected to said holding member for supporting the holding member on the floor of a vehicle beneath the steering wheel, and means connected to said support member for adjustably forcing said holding member upwardly against the steering wheel.

2. A mechanism for locking a steering system comprising a forked holding member having arms with recesses for engaging the ring of a steering wheel and engaging the spokes adjacent the steering wheel ring, means for adjustably spreading said arms to extend against the ring of the wheel at the ends of the spokes and to engage the spokes, means preventing movement of the arms in their adjusted spread position, a support member connected to said holding member for supporting the holding member on the floor of the vehicle beneath the steering wheel, and means connected to the support member for adjustably forcing said holding member up against the steering wheel ring and spokes.

3. A mechanism for non-rotatably locking a steering system of a vehicle comprising a support frame, a pair of holding arms laterally slidably mounted on the frame and having bifurcated ends for straddling a steering wheel ring and spokes of the ring, opposed parallel racks on the arms, said arms being non-yieldable in their adjusted position, a spreading pinion meshing with the racks for adjusting the lateral spread holding position of the arms, a support for mounting on the floor of a vehicle having a pivotally mounted base for adjusting to the floor angle, a vertical rack connected to the support, and a vertical adjusting pinion mounted on the frame and meshing with said vertical rack for adjusting the vertical position of the arms and holding the steering wheel immovable.

4. A mechanism for non-rotatably locking a steering system of a vehicle comprising a support frame, a pair of holding arms laterally slidably mounted on the frame and having bifurcated ends for engaging a steering wheel, said arms being bent with horizontal portions, lateral guides for the horizontal portions of the arms with the friction between the guides and the horizontal portions holding the arms immovable in lateral spread holding position, opposed parallel racks on said arms, a spreading pinion meshing with the racks for adjusting the lateral spread holding position of the arms, a support for mounting on the floor of a vehicle having a pivotally mounted base for adjusting to the floor angle, a vertical rack connected to the support, a vertical adjusting pinion mounted on the frame and meshing with the vertical rack for adjusting the vertical position of the arms and holding the steering wheel immovable, and means on the frame releasably locking the vertical adjusting pinion in position.

5. A mechanism for locking a steering system comprising a support frame, a pair of holding arms mounted on the frame, means supporting the arms for being laterally spreadable to a locked position in engagement with the steering wheel of a vehicle, said arms having recesses at the ends for straddling the rim of the wheel and being pushed against the ends of the wheel spokes, said arms being non-yieldable in said locked position, a support for engaging the floor of the vehicle, and adjustable connecting means between the support and the support frame for elevating the frame to move the holding arms in rigid engagement with the wheel.

References Cited in the file of this patent

UNITED STATES PATENTS

| Number | Name | Date |
|---|---|---|
| 602,279 | Battersby | Apr. 12, 1898 |
| 988,234 | West | Mar. 28, 1911 |
| 1,228,603 | Sabah | June 5, 1917 |
| 1,455,617 | Jackson | May 15, 1923 |
| 1,615,798 | Cowdrey | Jan. 25, 1927 |
| 1,882,323 | Jay | Oct. 11, 1932 |
| 2,011,254 | Nightingale | Aug. 13, 1935 |
| 2,354,883 | Schonberg | Aug. 1, 1944 |
| 2,531,675 | Field | Nov. 28, 1950 |
| 2,625,837 | Holmes | Jan. 20, 1953 |
| 2,669,882 | Shaffer et al. | Feb. 23, 1954 |
| 2,676,659 | Emmer | Apr. 27, 1954 |
| 2,711,228 | Shank | June 21, 1955 |
| 3,003,363 | De Hart | Oct. 10, 1961 |
| 3,064,921 | Berkeley | Nov. 20, 1962 |